(12) United States Patent
Tang

(10) Patent No.: US 6,759,113 B1
(45) Date of Patent: Jul. 6, 2004

(54) UNIFORM CURVED SURFACE STRUCTURE OF A BRIGHTNESS UNIT FOR A BRIGHTNESS ENHANCEMENT FILM

(76) Inventor: Shih-Chieh Tang, No. 206, Lane 167, Pen-Yuan St., Sec. 1., Annan Dist., Tainan (TW)

(*) Notice: Subject to any disclaimer, the term of this patent is extended or adjusted under 35 U.S.C. 154(b) by 0 days.

(21) Appl. No.: 10/429,719

(22) Filed: May 6, 2003

(30) Foreign Application Priority Data

Mar. 24, 2003 (TW) .................................. 92204674 U

(51) Int. Cl.⁷ ........................ B32B 3/00; G03B 21/60; G02F 1/00
(52) U.S. Cl. ................ 428/156; 428/141; 428/167; 428/913; 359/321; 359/454
(58) Field of Search .................................. 428/141, 156, 428/167, 172, 409, 913; 359/321, 454, 459, 530

(56) References Cited

U.S. PATENT DOCUMENTS

| | | | | |
|---|---|---|---|---|
| 4,542,449 A | * | 9/1985 | Whitehead | 362/330 |
| 5,635,278 A | * | 6/1997 | Williams | 428/172 |
| 5,993,940 A | * | 11/1999 | Ouderkirk et al. | 428/167 |
| 6,277,471 B1 | * | 8/2001 | Tang | 428/172 |

* cited by examiner

*Primary Examiner*—Donald J. Loney
(74) *Attorney, Agent, or Firm*—Bacon & Thomas PLLC

(57) ABSTRACT

A brightness enhancement film includes a top surface, a bottom surface and a plurality of brightness units arranged to form an array on the top surface. The brightness unit is consisted of a first cured surface and a second curved surface. Each of the first cured surface and the second curved surface is extended downward to terminate at a curved bottom edge so as to form a uniform curvature of the curved surface.

3 Claims, 4 Drawing Sheets

UNIFORM CURVED SURFACE STRUCTURE OF A BRIGHTNESS UNIT FOR A BRIGHTNESS ENHANCEMENT FILM

BACKGROUND OF THE INVENTION

1. Field of the Invention

The present invention is related to a uniform curved structure of a rightness unit for a brightness enhancement film applied to a display. More particularly, the present invention is related to a brightness enhancement film having uniform curved surfaces to form enhancement units that improve entire optical characteristic.

2. Description of the Related Art

Referring to FIG. 1, International Patent Publication No. WO 96/23649 discloses a brightness enhancement film including a base 1 and a plurality of prisms 2 juxtaposed in order on the base 1. Each of the prisms 2 consisted of a first flat facet 2a and a second flat facet 2b adapted to refract light to condense light.

However, the first flat facet 2a and the second flat facet 2b are flat surfaces different from curved surface and thus only able to refract light in one dimension with respect to a top horizontal surface of the brightness enhancement film. Namely, the brightness enhancement film is only able to condense light in one dimension as well as one-dimensional refraction.

Referring to FIG. 2, U.S. Pat. No. 6,277,471, issued on Aug. 21, 2001 to Tang, discloses an another brightness enhancement film including a base 11 and a brightness layer 12. The base 11 has a top surface and a bottom surface. Also, the brightness layer 12 has a top surface and a bottom surface. A plurality of rippled ridges 121 are juxtaposed in order and each of which is consisted of brightness units 122 arranged in order. Each of the brightness units 122 is consisted of a pair of curved surfaces which may refract light in two dimensions so that the brightness unit 122 is able to condense light in two dimensions. Structurally, the bottom surface of the brightness layer 12 is adhered to the top surface of the base 11 to form the brightness enhancement film.

Referring again to FIGS. 1 and 2, U.S. Pat. No. 6,277,471 achieves condensing light in two dimensions by replacing the flat facets 2a and 2b of WO 96/23649 with the curved surfaces of brightness units 122. Therefore, U.S. Pat. No. 6,277,471 improves drawback of WO 96/23649 that merely condenses light in one dimension.

Referring again to FIG. 2, the brightness unit 122 is consisted of a first curved surface 123 and a second curved surface 124 whose curvature able to refract light in two dimensions that the condensing function is accomplished. The first curved surface 123 and the second curved surface 124 slope gently toward the top surface of the brightness layer 12 so that bottom edges of the first curved surface 123 and the second curved surface 124 are commonly terminated at a straight bottom edge 125. The straight bottom edge 125 is located between the two adjacent brightness units 122 and the straight bottom edges 125 are serially connected each other to form a wave trough.

Generally, the curvature of the first curved surface 123 and the second curved surface 124 are able to refract light for condensing. However, the first curved surface 123 and the second curved surface 124 are sloped gently toward the straight bottom edge 125, and thus the surface adjacent to the straight bottom edge 125 is performed nearly a horizontally flat surface. The slightly curvature of the flat surface is inadequate to refract light in two dimension. Although the first curved surface 123 and the second curved surface 124 are able to refract light in two dimensions, the surface adjacent to the straight bottom edge 125 may reduce entire refractive efficiency of the brightness unit 122.

The present invention intends to provide a uniform curved surface structure of a brightness unit for a brightness enhancement film. Each of the brightness units comprise a curved surface uniformly extended downward to terminate at a curved bottom edge so as to form a uniform curvature of the curved surface for increasing entire refractive efficiency in two dimensions in such a way to mitigate and overcome the above problem.

SUMMARY OF THE INVENTION

The primary objective of this invention is to provide a uniform curved surface structure of a brightness unit for a brightness enhancement film, which comprises a curved surface uniformly extended downwardly to form a curved bottom edge with uniform curvature so as to increase entire refractive efficiency in two dimensions.

The secondary objective of this invention is to provide brightness units for a brightness enhancement film, which are arranged in disorder so as to reduce morie phenomenon.

The brightness enhancement film in accordance with the present invention comprises a top surface, a bottom surface and a plurality of brightness units arranged to form an array on the top surface. The brightness unit is consisted of a first cured surface and a second curved surface. Each of the first cured surface and the second curved surface is extended downward to terminate at a curved bottom edge so as to form a uniform curvature of the curved surface.

Other objectives, advantages and novel features of the invention will become more apparent from the following detailed description and the accompanying drawings.

BRIEF DESCRIPTION OF THE DRAWINGS

The present invention will now be described in detail with reference to the accompanying drawings herein.

DETAILED DESCRIPTION OF THE INVENTION

Referring to FIGS. 4 through 7, a brightness unit structure of the present invention has some similar configuration and some same function as the conventional brightness unit, and the repeated description is omitted.

Figure 4:
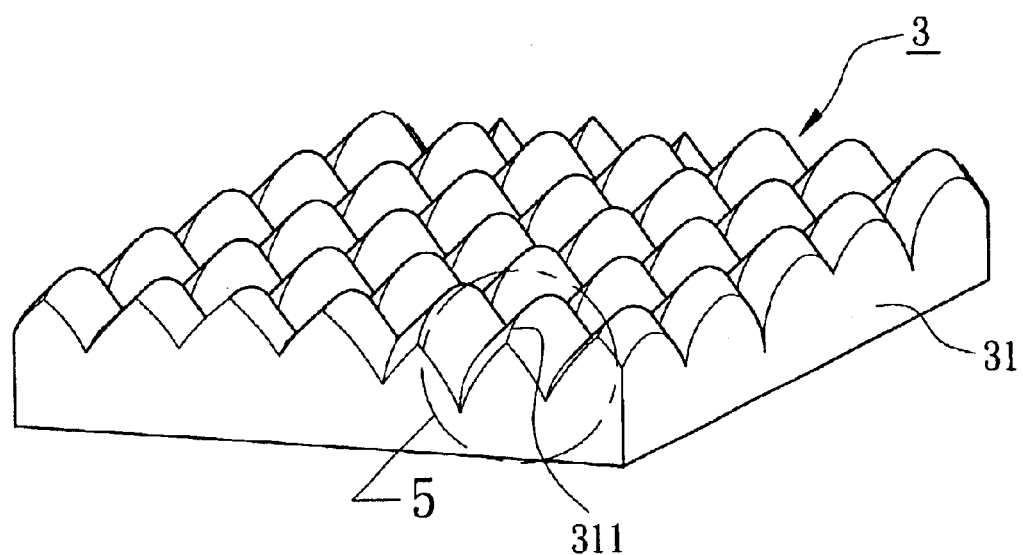
FIG. 4 is a perspective view of a uniform curved surface structure of a brightness unit for a brightness enhancement film in accordance with an embodiment of the present invention.
Figure 5:
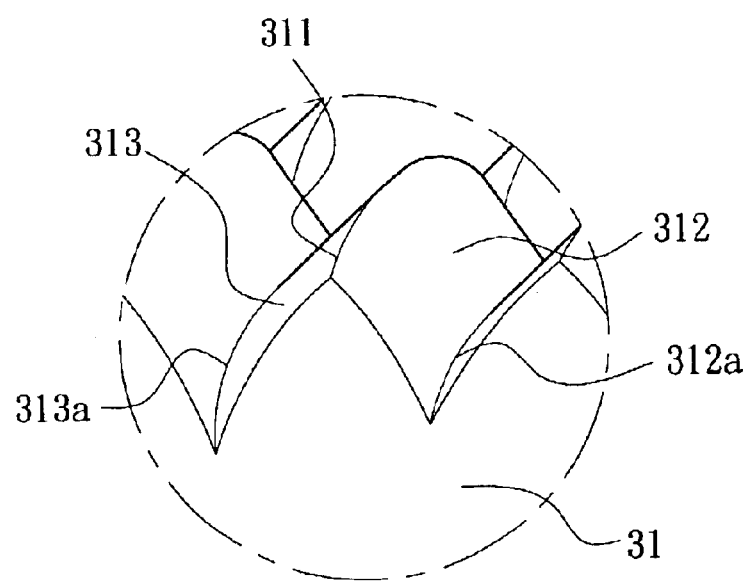
FIG. 5 is an enlarged view in FIG. 4 of the uniform curved surface structure of the brightness unit in accordance with the embodiment of the present invention.

Referring to FIGS. 4 and 5 a brightness enhancement film 3 in accordance with the present invention is a waved film 31. The waved film 31 includes a microstructure layer having a top surface and a bottom surface. Light is able to penetrate through the waved film 31 from the bottom surface to the top surface. The configuration of the microstructure layer of the waved film 31 is consisted of a plurality of wave peaks and a plurality of wave troughs.

Referring again to FIGS. 4 and 5, the top surface of the waved film 31 is consisted of a plurality of brightness units 311 which are arranged in disorder to form an irregular array. The brightness unit 311 is adapted to enhance refractive efficiency in two dimensions. As the light has penetrated through the brightness units 311 from the bottom surface to the top surface, the uniform refractive effect is accomplished.

Construction of the brightness unit 311 shall be described in detail, referring again to FIGS. 5 and 6. Each of the brightness unit 311 is comprised of a first curved surface 312 and a second curved surface 313 so that a wave peak unit is protruded on the top surface of the waved film 31. On the entire top surface of the waved film 31, the first curved surfaces 312 and the second curved surfaces 313 are arranged adjacent each other.

Referring again to FIGS. 5 and 6, since the brightness unit 311 is formed with an elemental curved body 30, the waved film 31 is consisted of a plurality of the elemental curved bodies 30 which are integrally connected each other. Any line of the curved surface of the elemental curved body 30 is a curved line and it is in a specific range of curvature. Therefore, the curved surface of the elemental curved body 30 is able to refract light in two dimensions.

Referring again to FIGS. 6 and 7, after cutting the elemental curved body 30, there are a first cut section 30$a$, a second cut section 30$b$, a third cut section 30$c$ and a fourth cut section 30$d$. The first cut section 30$a$, the second cut section 30$b$ and the third cut section 30$c$ are formed with a first curve line 300$a$, a second curve line 300$b$ and a third curve line 300$c$ respectively instead of a straight line. The curvatures of the first curve line 300$a$, the second curve line 300$b$ and the third curve line 300$c$ may be slightly different at each points and thus it may generate different refractive angles on the curve lines.

Figure 6:
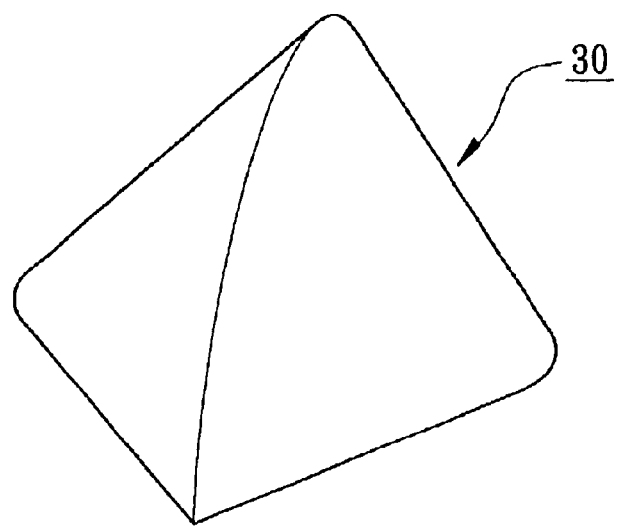
FIG. 6 is a schematic perspective view of the uniform curved surface structure of the brightness unit in accordance with the embodiment of the present invention.
Figure 7:
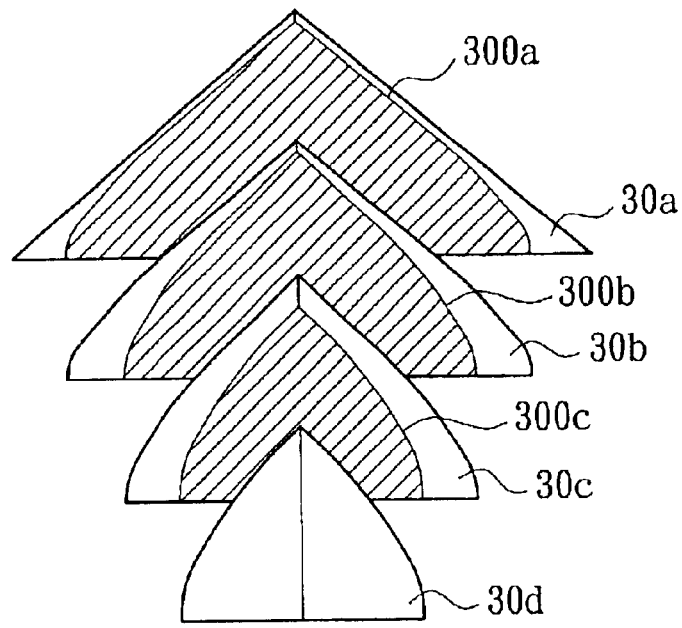
FIG. 7 is an exploded partially cutting view of the uniform curved surface structure of the brightness unit in accordance with the embodiment of the present invention.

Referring again to FIGS. 5 and 6, in each brightness unit 311 the first curved surface 312 and the second curved surface 313 are adjacent and joined to form a ridge. Meanwhile, the first curved surface 312 and the second curved surface 313 are extended downward to form first curved bottom edge 312$a$ and a second curved bottom edge 313$a$ respectively. Since the first curved surface 312 and the second curved surface 313 are correspondingly terminated at the first curved bottom edge 312$a$ and the second curved bottom edge 313$a$, the curvature is uniform. Also, the first curved bottom edge 312$a$ and the second curved bottom edge 313$a$ commonly define a boundary between any two adjacent brightness unit 311. In structure, the first curved bottom edge 312$a$ and the second curved bottom edge 313$a$ are extended downward into a wave trough. As best shown in FIG. 6, the first curved bottom edge 312$a$ and the second curved bottom edge 313$a$ are located between any two adjacent brightness unit 311.

Referring again to FIGS. 6 and 7, the bottom edges of the brightness unit 311 is provided with various depths due to the changes of the first curved bottom edge 312$a$ and the second curved bottom edge 313$a$. The first curved surface 312 and the second curved surface 313 are uniformly and symmetrically extended downward from the top to bottom so that the first curved surface 312 and the second curved surface 313 adjacent to the bottom edges are provided with a specific range of curvature. Consequently, the first curved surface 312 and the second curved surface 313 adjacent to the bottom edges are able to refract light in two dimensions with respect to the top surface of the waved film 31 that may enhance entire refractive efficiency in two dimensions.

Figure 1:
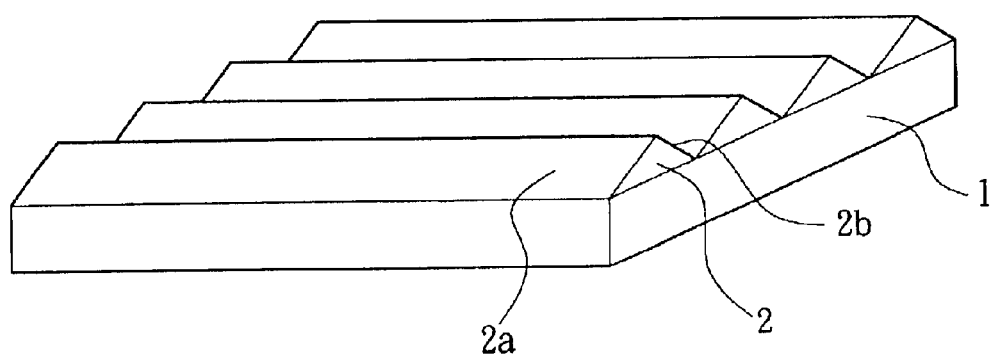
FIG. 1 is a perspective view of International Patent Publication No. WO96/23649 in accordance with the prior art.

Referring again to FIGS. 1 and 5, the first curved surface 312 and the second curved surface 313 of the brightness unit 311 of the present invention have replaced the first flat facet 2$a$ and the second flat facet 3$b$ of International Patent Publication No. WO 96/23649, and thus the two-dimensional refraction of the brightness enhancement film of the present invention improves the one-dimensional refraction of the brightness enhancement film disclosed in No. WO 96/23649.

Figure 2:
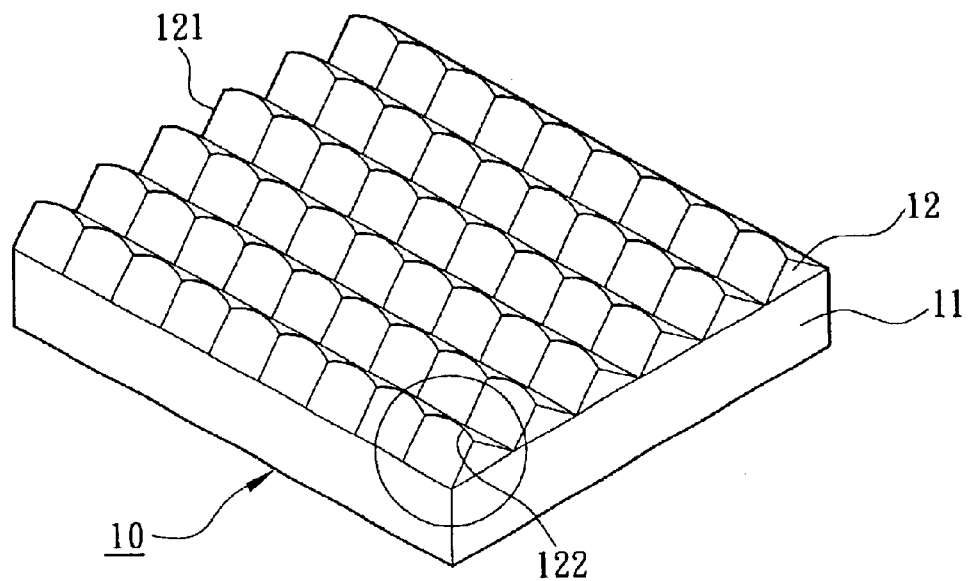
FIG. 2 is a perspective view of U.S. Pat. No. 6,277,471 in accordance with the prior art.
Figure 3:
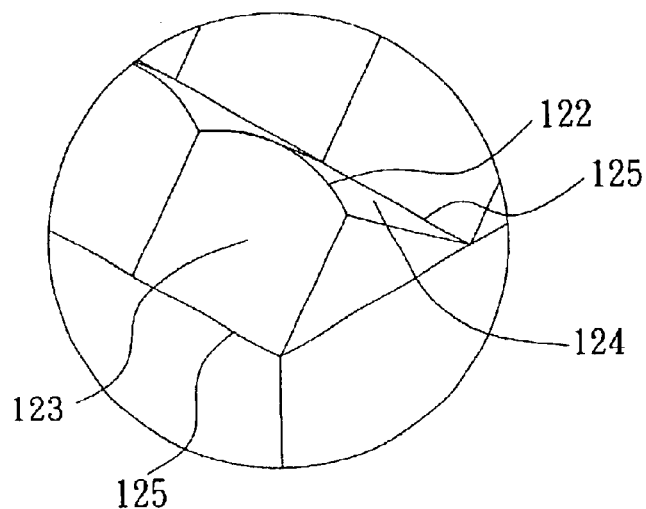
FIG. 3 is an enlarged view in FIG. 2 of U.S. Pat. No. 6,277,471 in accordance with the prior art.

Referring again to FIGS. 2 and 5, the two surfaces 123 and 124 of the brightness unit 122 adjacent to the straight bottom edge 125 disclosed in U.S. Pat. No. 6,277,471 are sloped gently and thus the slope is approximated zero that may reduce the entire two-dimensional refraction. By contrast, the two curved surfaces 312 and 313 adjacent to the curved bottom edges 312$a$ and 313$a$ of the present invention have adequate curvature to refract light in two dimensions to thereby enhance the entire two-dimensional refractive efficiency.

Although the invention has been described in detail with reference to its presently preferred embodiment, it will be understood by one of ordinary skill in the art that various modifications can be made without departing from the spirit and the scope of the invention, as set forth in the appended claims.

What is claimed is:

1. A brightness enhancement film having a uniform curved surface structure, comprising:

a waved film including a top surface and a bottom surface through which penetrating light that is refracted;

a plurality of brightness units arranged on the top surface of the waved film to form an array, each of the brightness units able to refract light in two dimensions for condensing light; and a plurality of curved bottom edges located at a bottom portion of each of the brightness units so that an adjacent surface to the curved bottom edge formed with a uniform curved surface that has an adequate curvature to generate a two-dimensional retraction with respect to the top surface of the wave film.

2. The brightness enhancement film having the uniform curved surface structure as defined in claim 1, wherein each of the brightness units is comprised of a first curved surface and a second curved surface; the first curved surface and the second curved surface are extended downward and terminated at a first curved bottom edge and a second curved bottom edge respectively that the curved surfaces adjacent to the curved bottom edges have uniform curvatures.

3. The brightness enhancement film having the uniform curved surface structure as defined in claim 1, wherein the brightness units are arranged in disorder to form the waved film.

* * * * *